May 2, 1933.  B. SHIVEK  1,906,640
MACHINE FOR MAKING ICE CREAM CONES
Filed June 10, 1931
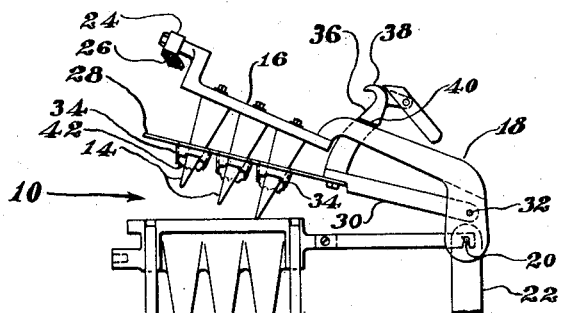
Fig.1
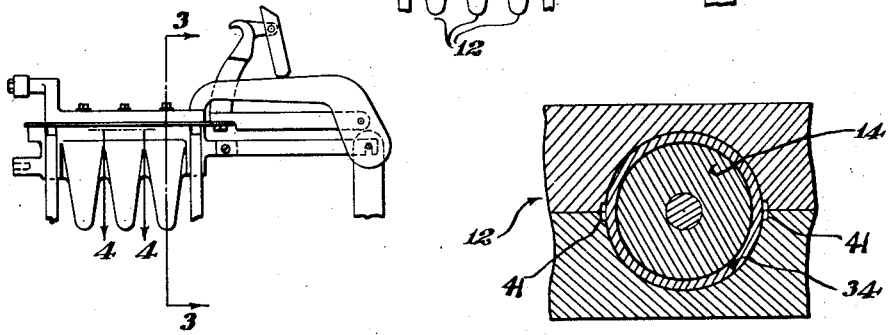
Fig.2
Fig.4
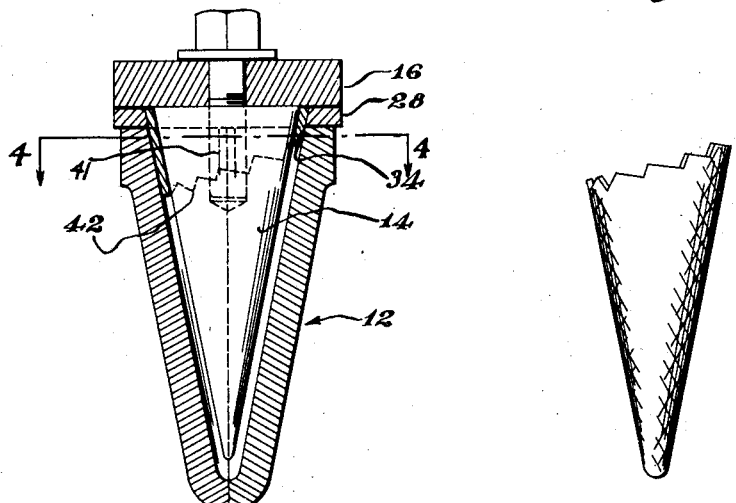
Fig.3
Fig.5
Inventor
Bernard Shivek
by Van Cowen Fish
Hildreth Hary attys.

Patented May 2, 1933

1,906,640

UNITED STATES PATENT OFFICE

BERNARD SHIVEK, OF BOSTON, MASSACHUSETTS, ASSIGNOR TO SAMUEL WERLIN, OF MALDEN, MASSACHUSETTS, AND MORRIS B. WHITE, OF CHELSEA, MASSACHUSETTS

MACHINE FOR MAKING ICE CREAM CONES

Application filed June 10, 1931. Serial No. 543,348.

The present invention relates to machines for making ice cream cones.

One object of the present invention is to provide a simple and efficient machine for making ice cream cones which results in a minimum amount of wasted material.

Another object of the invention is to provide an ice cream cone machine with provision for making a cone with an ornamental edge.

With these and other objects in view, as will hereinafter appear, the present invention comprises a machine having a split female mold, together with a male mold, and a stripper device which has a downwardly extended conical sleeve closely engaging both the male mold and the female mold. In view of the close fit of the conical sleeve with all sections of the mold, the machine operates with a minimum wastage of material. The female mold members are provided with small grooves to permit overflow of excess material in the form of small lugs, as contrasted with the large flanges usually formed on cones made by existing machines. Although the invention is suitable for use in making cones of any desired shape, the conical sleeve may be constructed with a bottom edge of any desired design to give an ornamental effect to the top edge of the cone.

Other features of the invention consist of certain novel features of construction, combinations and arrangements of parts hereinafter described and particularly defined in the claims.

In the accompanying drawing Fig. 1 is an elevation of the preferred form of the invention, showing the molds open; Fig. 2 is an elevation, showing the molds closed; Fig. 3 is a section taken on line 3—3 of Fig. 2; Fig. 4 is a sectional plan taken on line 4—4 of Fig. 3; and Fig. 5 is a view of the cone produced by this machine.

The illustrated embodiment of the invention comprises a machine of the rotary table type, having a plurality of gang molds, one of which is shown at 10. Each gang comprises, as shown, three cone-shaped female molds 12 split longitudinally of a well-known manner, as indicated in Fig. 3. A male cone-shaped mold 14 is provided for each female mold. Each gang of three male cone molds is fastened to a plate 16 integral with an arm 18 pivoted at 20 on an upstanding support 22 which forms a part of the rotary table.

As usual in this type of machine, a rotary table carrying the gang molds rotates through a baking oven. At the front of the machine, after completion of baking, means are provided for laterally splitting the female mold, thus releasing the baked cone from the female mold. Means are also provided for raising the male cone molds during the interval through which the female molds are open. Rotation of the rotary table causes a roll 24 fastened to the plate 16 to move over a downwardly sloping track 26 which is fastened to the stationary frame of the machine. This track allows the male cone molds to enter the female molds after a certain amount of rotation of the rotary table. The batter is placed in the closed female molds while the male molds are gradually descending. The parts thus far described are common to the well-known rotary machine, and the particular mechanisms for operation are not described in detail.

Each gang of male cone molds is provided with a stripper plate 28 rigidly fastened to an arm 30 which is pivoted to the male cone mold support arm 18 at 32. The arm 30 is provided with an upstanding portion 36, the top of which is hooked, as shown, at 38. It is to this hooked portion that means for lifting the stripper plate 28 are applied. A shoulder 40 on the upstanding portion 36 limits relative separative motion between the stripper plate 28 and the male cone support plate 16. Depending conical sleeves 34 are secured in holes in the stripper plate 28. When the molds are closed, as shown in Fig. 2, the conical sleeves 34 fit closely inside of the female molds and the male cone molds fit closely inside of the conical sleeves. Each sleeve is therefore of the same thickness at the completed cone. Each of the three cone-shaped female molds 12 is provided with two grooves 41 at the parting line which provide for the overflow of excess cone material, as shown in Fig. 4.

In the operation of the machine, equal measured quantities of raw batter are poured into each of the three cone-shaped female molds 12 after they have been closed. Relative rotary motion between the table and the stationary inclined track then allows the three male cone molds to gradually descend into the three female molds 12. The rotation of the table then carries the molds into the oven. In baking, the cone material expands, filling the mold completely and overflowing slightly up into the overflow grooves 41. After emerging from the oven, the female molds are split, the baked cones remaining on the male cone molds. The stripper plate support arm 30 is then raised, carrying the male cone molds and the baked cones up with it. The male cone molds are held in that position for an interval but the stripper plate is allowed to drop and in so doing, it removes from the male cone molds the baked cones which may be collected in any suitable manner.

One advantage of this machine is that there is no flange on the top of the cone to be trimmed off. The small lugs which are formed in the overflow grooves are very fragile and will be broken off during the opening of the molds or in packing the cones. The amount of material in these lugs is very small as compared to the amount of material in the usual flanges which are formed on the top of the cones.

Another advantage of the machine is that the cones may be formed with an ornamental edge, as shown in Fig. 5. This ornamental edge is formed by an irregular lower edge 42 of the conical sleeves 34. The conical sleeves may, however, be plain, in which case the machine would form the usual plain-topped cone.

Having thus described the invention, what is claimed is:

An ice cream cone machine comprising a split female mold, a male mold, and an integral stripper sleeve which closely fits between the upper part of the female mold and the upper part of the male mold, the sleeve having an irregular bottom edge to form an ornamental edge on the finished cone.

In testimony whereof I have signed my name to this specification.

BERNARD SHIVEK.